2,816,900

PREPARATION OF METHYL VIOLET

Guy S. Herrick, Bound Brook, and Joseph C. Conger and Mario W. Savio, Somerville, N. J., assignors to American Cyanamid Company, New York, N. Y., a corporation of Maine No Drawing. Application October 14, 1954,
Serial No. 462,382

10 Claims. (Cl. 260—391)

This invention relates to a novel process for the preparation of methyl violet.

Methyl violet (Color Index No. 680) is a well known dye of the structure

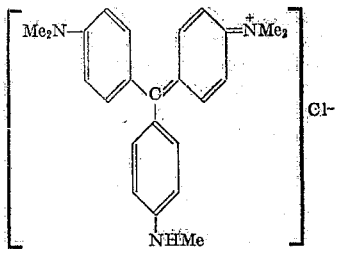

and is generally prepared by the oxidation of dimethylaniline in the presence of copper sulfate and sodium chloride. The process is believed to proceed by the oxidation of a methyl group in a molecule of dimethylaniline to formaldehyde, which condenses with the monomethylaniline and dimethylaniline giving derivatives of diphenylmethane which are oxidized in the presence of excess dimethylaniline to form methyl violet.

In the process it is necessary to have a phenolic body present during the oxidation or otherwise the yields of methyl violet are lowered drastically. The commonly used phenolic bodies are phenol, cresol and xylenol. However, methyl violet produced in the presence of the phenolic compound invariably has a strong odor which can only be removed by steam distillation, solvent extraction or purifying through the color base. The extra step involved in order to produce a saleable product is expensive and cannot be tolerated in a low cost dyestuff where the margin of profit is small. However, the odor of the methyl violet produced by the phenol process is so objectionable for certain uses that in the past it has been necessary to resort to this added and expensive purification step or otherwise the product was not acceptable for use.

The present invention is based upon the discovery that when the dimethylaniline is emulsified in the solution of copper sulfate and sodium chloride by a suitable emulsifying agent as elaborated upon more fully hereinafter, the oxidation of the dimethylaniline may be carried out in the absence of a phenolic compound with surprisingly good yields, and the final product has none of the objectionable odors associated with the product produced by the conventional procedure. Therefore, no purification step is necessary as is true with the product produced by the present-day process and a commercially acceptable product free from objectionable odors is produced directly.

It is a surprising feature of the present invention that the emulsifying agents may be used so effectively to produce good yields of methyl violet in place of phenol since the phenolic bodies customarily used are not emulsifying agents nor do they function in the manner of an emulsifying agent. Just why the present invention works so effectively with an emulsifying agent instead of with phenol, is not understood and no theory can be advanced thereon.

In carrying out the present invention, the copper sulfate and sodium chloride are dissolved in a minimum amount of water. The emulsifying agent is then added followed by the dimethylaniline. The mixture is stirred to produce a good emulsion and then heated to reaction temperature. The oxidation of the dimethylaniline is carried out in the conventional manner by the use of a suitable oxidizing agent such as oxygen, sodium chlorate, potassium chlorate, etc. and the methyl violet thus produced is isolated from the reaction mixture in the usual manner.

The emulsifying agents which have been found capable of producing good yields of methyl violet, that is yields of the same order of magnitude as are produced by the present-day practice using phenol, but without the objectionable odor of the conventionally produced methyl violet, are: alkylol-substituted aliphatic guanidinium N-alkylol-substituted aliphatic carbamates prepared according to the procedure described in U. S. Patent No. 2,574,510 and marketed under the trademark "Aerosol C–61"; alkyl amidoalkyl imidazolines, such as the product marketed under the trademark "Onyxsan S"; polyamino esters such as the product marketed under the trademark "Sotex C"; quaternary ammonium compounds of the formula R—N(CH$_3$)$_3$Cl such as lauryltrimethylammonium chloride sold under the trademark of "Arquad 12"; sodium alkyl naphthalene sulfonates such as the product sold under the trademark "Alkanol B"; oil soluble petroleum sulfonates, such as the product sold under the trademark "Hyponate L–50"; as well as the pure compounds, octyl alcohol and dibutyl phthalate.

Aerosol C–61 and Sotex C are the preferred emulsifying agents since higher yields appear to be obtainable in the herein-described process with these reagents.

The emulsifying agents may be used in amounts as low as 0.5 part for each 100 parts by weight of the dimethylaniline, but we prefer to use from 1 to 5 parts of the emulsifying agent for each 100 parts of dimethylaniline in order to obtain a fully effective emulsion. Quantities in excess of this may be used, if desired, without adversely affecting the yield of methyl violet, but ordinarily there is no advantage in doing so.

The invention will be described in greater detail in conjunction with the following specific examples in which the parts are by weight unless otherwise specified:

Example 1

To a solution of 160 parts of copper sulfate crystals and 53 parts of sodium chloride in 540 parts of water is added 24 parts of a siliceous filter aid. Three parts of alkylol-substituted aliphatic guanidinium N-alkylol-substituted aliphatic carbamate is then added followed by 224 parts of dimethylaniline. The slurry is stirred vigorously and is then heated to approximately 60° C. A solution of 56 parts of sodium chlorate in 120 parts of water is added gradually. The charge is then stirred at 60° C. until the reaction is substantially complete. The mixture is then heated to 85° C. and cooled to room temperature. The methyl violet is isolated by fixing the copper as the sulfide, decanting the mother liquor, extracting the violet from the residue with hot water, salting the violet from the extraction liquors and separating. A good yield of odorless methyl violet is obtained.

Example 2

The procedure of Example 1 is followed using an equivalent quantity of alkyl amidoalkyl imidazoline as the emulsifying agent. A methyl violet equivalent in yield and quality to that produced in Example 1 is obtained.

Example 3

The procedure of Example 1 is followed using an equivalent amount of lauryltrimethylammonium chloride as the emulsifying agent. The product is equivalent in yield and purity to that produced in Example 1.

Example 4

The procedure of Example 1 is used except that an equivalent amount of sodium alkyl naphthalene sulfonate is used as the emulsifying agent. The yield of the odorless methyl violet is similar to that obtained in Example 1.

Example 5

The procedure of Example 1 is used except that an equivalent amount of octyl alcohol is used as the emulsifying agent. An odorless methyl violet is obtained in good yield.

Example 6

The procedure of Example 1 is followed using an equivalent amount of dibutyl phthalate as the emulsifying agent. A product is obtained equivalent in quality and yield to that of Example 1.

Example 7

The procedure of Example 1 is followed except that an equivalent amount of polyamino ester is used as the emulsifying agent. An odorless methyl violet is obtained in good yield.

Example 8

The procedure of Example 1 is followed except that an equivalent amount of oil soluble petroleum sulfonate is used as the emulsifying agent. An odorless methyl violet is obtained in good yield.

We claim:

1. In the process of producing methyl violet by the oxidation of dimethylaniline in the presence of a copper salt, the improvement which comprises, in a phenolic-body-free system emulsifying the dimethylaniline in a solution of the copper salt with an emulsifying agent selected from the group consisting of alkylol-substituted aliphatic guanidinium N-alkylol-substituted aliphatic carbamates, alkyl aminoalkyl imidazolines, polyamino esters, long chain quaternary ammonium compounds, sodium alkyl naphthalene sulfonates, oil-soluble petroleum sulfonates, octyl alcohol and dibutyl phthalate, and oxidizing the emulsified dimethylaniline whereby methyl violet free from objectionable odors is produced.

2. The process according to claim 1 in which the emulsifying agent is an alkylol-substituted aliphatic guanidinium N-alkylol-substituted aliphatic carbamate.

3. The process according to claim 1 in which the emulsifying agent is an alkyl amidoalkyl imidazoline.

4. The process according to claim 1 in which the emulsifying agent is a polyamino ester.

5. The process according to claim 1 in which the emulsifying agent is a long-chain quaternary ammonium compound.

6. The process according to claim 1 in which the emulsifying agent is a sodium alkyl naphthalene sulfonate.

7. The process according to claim 1 in which the emulsifying agent is an oil-soluble petroleum sulfonate.

8. The process according to claim 1 in which the emulsifying agent is octyl alcohol.

9. The process according to claim 1 in which the emulsifying agent is dibutyl phthalate.

10. The process according to claim 1 in which the emulsifying agent is lauryltrimethylammonium chloride.

References Cited in the file of this patent

Colour Index, 1924, Methyl Violet No. 680, p. 174.